United States Patent
Inoue et al.

(10) Patent No.: US 8,195,369 B2
(45) Date of Patent: Jun. 5, 2012

(54) CONTROL APPARATUS AND CONTROL METHOD OF CONTINUOUSLY VARIABLE TRANSMISSION, PROGRAM FOR REALIZING THAT METHOD, AND RECORDING MEDIUM ON WHICH THAT PROGRAM IS RECORDED

(75) Inventors: Daisuke Inoue, Toyota (JP); Tadashi Tamura, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 812 days.

(21) Appl. No.: 12/225,687

(22) PCT Filed: Oct. 2, 2007

(86) PCT No.: PCT/IB2007/002894
§ 371 (c)(1),
(2), (4) Date: Sep. 26, 2008

(87) PCT Pub. No.: WO2008/041093
PCT Pub. Date: Apr. 10, 2008

(65) Prior Publication Data
US 2009/0234546 A1    Sep. 17, 2009

(30) Foreign Application Priority Data

Oct. 4, 2006  (JP) ................................. 2006-273151

(51) Int. Cl.
*G06F 17/00* (2006.01)
*F16H 61/00* (2006.01)

(52) U.S. Cl. ............................................. 701/51; 477/45
(58) Field of Classification Search .................... 701/51, 701/53, 54; 477/34–165
See application file for complete search history.

(56) References Cited

U.S. PATENT DOCUMENTS 4,759,236 A    7/1988  Tezuka et al.
5,948,036 A *  9/1999  Okubo ............................ 701/78
(Continued)

FOREIGN PATENT DOCUMENTS

EP    1226993 A1    7/2002
(Continued)

OTHER PUBLICATIONS

Dec. 8, 2008 Office Action issued in Japanese Patent Application No. 2006-273151.

*Primary Examiner* — James Trammell
*Assistant Examiner* — Muhammad Shafi
(74) *Attorney, Agent, or Firm* — Oliff & Berridge, PLC

(57) ABSTRACT

An ECU executes a program that includes a step of increasing belt squeezing pressure to a value P (ON) greater than a normal value P (OFF) that is set as the belt squeezing pressure when a footbrake switch is off, when the footbrake switch is on and the time elapsed after the footbrake switch was turned on is less than a threshold value T (0); and a step of gradually reducing the belt squeezing pressure to the normal value P (OFF) when the time elapsed after the footbrake switch was turned on is equal to or greater than the threshold value. As a result, a decrease in fuel efficiency of a vehicle in which a continuously variable transmission is mounted, as well as a reduction in the durability of a belt of this continuously variable transmission, can be reduced.

12 Claims, 15 Drawing Sheets

U.S. PATENT DOCUMENTS

2004/0111204 A1 * 6/2004 Kojima et al. .................. 701/59

FOREIGN PATENT DOCUMENTS

| JP | A-61-132431 | 6/1986 |
| JP | A-63-074732 | 4/1988 |
| JP | A-63-176750 | 7/1988 |
| JP | A-01-242863 | 9/1989 |
| JP | A-02-102960 | 4/1990 |
| JP | A-08-210450 | 8/1996 |
| JP | A-08-210453 | 8/1996 |
| JP | A-11-044359 | 2/1999 |
| JP | A-2002-327835 | 11/2002 |
| JP | A-2004-138105 | 5/2004 |
| JP | A-2007-120732 | 5/2007 |
| WO | WO9954613 | * 10/1999 |

* cited by examiner

F I G . 6
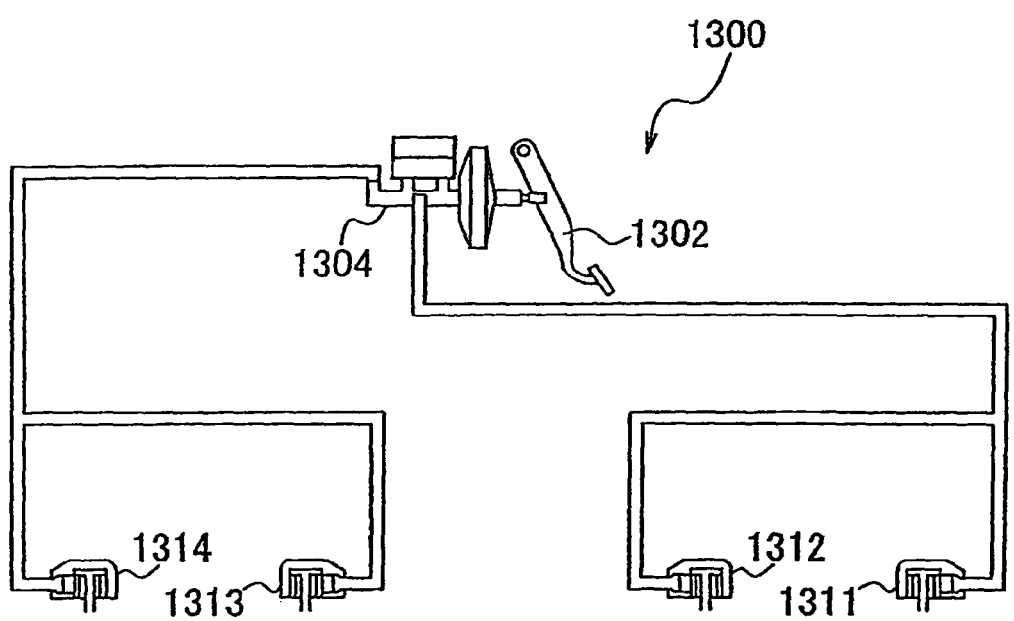

CONTROL APPARATUS AND CONTROL METHOD OF CONTINUOUSLY VARIABLE TRANSMISSION, PROGRAM FOR REALIZING THAT METHOD, AND RECORDING MEDIUM ON WHICH THAT PROGRAM IS RECORDED

The disclosure of Japanese Patent Application No. 2006-273151 on Oct. 4, 2006, including the specification, drawings and abstract is incorporated herein by reference in its entirety.

BACKGROUND OF THE INVENTION

1. Field of the Invention

The invention relates to a control apparatus and a control method of a continuously variable transmission, a program for realizing that method, and a recording medium on which that program is recorded. More specifically, the invention relates to technology for controlling the squeezing pressure applied to a transmission belt of a continuously variable transmission.

2. Description of the Related Art

A continuously variable transmission (hereinafter simply referred to as "CVT") is known in which a transmission belt is wound around a pair of pulleys, the gap widths of which can be changed. In this kind of continuously variable transmission, squeezing pressure is applied to the transmission belt so that it will not slip. However, during sudden braking of the vehicle, for example, the output rotation speed of the CVT rapidly decreases. As a result, excessive torque is transmitted to the transmission belt which might cause it to slip. Therefore, in order to prevent the transmission belt from slipping during sudden braking, there is technology which increases the squeezing pressure that is applied to the transmission belt during sudden braking.

Japanese Patent Application Publication No. 8-210450 (JP-A-8-210450) descries a line pressure control apparatus that can appropriately control line pressure in a V-belt type continuously variable transmission so that the line pressure is neither excessive nor insufficient when the vehicle is braked. The line pressure control apparatus described in JP-A-8-210450 includes a bake detecting portion, a speed ratio calculating portion, and a braking line pressure increasing portion. The brake detecting portion detects braking in a vehicle provided with a V-belt type continuously variable transmission structured such that line pressure is applied to a variable flange of one of two pulleys around which a V-belt is wound, shift control pressure obtained by reducing the line pressure using a shift control valve is applied to the variable flange of the other pulley, and a speed ratio is controlled in a stepless fashion according to the differential pressure between the shift control pressure and the line pressure. The speed ratio calculating portion calculates the actual speed ratio of the V-belt type continuously variable transmission. The braking line pressure increasing portion increases the line pressure to a value set according to the actual speed ratio during braking of the vehicle.

According to the line pressure control apparatus described in that publication, the line pressure is increased to a value that is set according to the actual speed ratio of the continuously variable transmission during braking of the vehicle. Accordingly, the line pressure can be controlled so that the V-belt will not slip even when the wheels rapidly decelerate when the vehicle is being braked. As a result, it is possible to prevent the durability of the V-belt from decreasing.

However, with the line pressure control apparatus according to JP-A-8-210450, the line pressure is increased during braking which means that the belt squeezing pressure is increased even during gradual braking as well. During gradual braking, however, excessive torque is not input to the belt so there is no need to increase the amount of squeezing pressure applied to the belt. Conversely, increasing the amount of squeezing pressure applied to the belt during gradual braking adversely effects fuel efficiency as well as the durability of the belt.

SUMMARY OF THE INVENTION

In view of the foregoing problems, this invention thus provides a control apparatus and a control method of a continuously variable transmission which can reduce the extent to which fuel efficiency and belt durability are adversely effected, as well as a program for realizing that method, and a recording medium on which that program is recorded.

One aspect of the invention thus relates to a control apparatus of a continuously variable transmission having a pair of pulleys with variable groove widths, and a transmission belt which is wound around the pair of pulleys and transmits power by frictional force. This control apparatus includes a first control portion that increases squeezing pressure applied to the transmission belt when a footbrake switch that detects a brake operation of a vehicle is turned on; a measuring device that measures the time elapsed after the footbrake switch was turned on; and a second control portion that reduces the increased squeezing pressure when the measured elapsed time becomes equal to or greater than a predetermined period of time.

Also, another aspect of the invention relates to control method of a continuously variable transmission having a pair of pulleys with variable groove widths, and a transmission belt which is wound around the pair of pulleys and transmits power by frictional force. This method includes the steps of increasing squeezing pressure applied to the transmission belt when a footbrake switch that detects a brake operation of a vehicle is turned on; measuring the time elapsed after the footbrake switch was turned on; and reducing the increased squeezing pressure when the measured elapsed time becomes equal to or greater than a predetermined period of time.

According to the control apparatus and control method of a continuously variable transmission described above, the squeezing pressure applied to the transmission belt is increased when the brake switch that detects a brake operation of the vehicle is turned on, and the time elapsed after this brake switch was turned on is measured. When the vehicle is braked suddenly, the brake operation is performed for a short period of time so when the brake operation is performed for an extended period of time, it can be determined that the vehicle is being braked gradually. Therefore, when the elapsed time that was measured is equal to or longer than a predetermined period of time, the increased squeezing pressure is reduced. As a result, the belt squeezing pressure can be reduced when the vehicle is being braked gradually. Thus, more squeezing pressure than is necessary can be inhibited from being applied to the belt. Hence, a control apparatus and control method of a continuously variable transmission can be provided which can reduce the extent to which fuel efficiency and belt durability are adversely effected.

Also, in the foregoing control apparatus and control method, the predetermined period of time may be set shorter when a vehicle speed is low than when the vehicle speed is high.

According to the control apparatus and control method described above, the time required to stop the vehicle after a brake operation is less when the vehicle speed is low so the time set to compare the elapsed time after the brake switch was turned on is set shorter when the vehicle speed is low than it is when the vehicle speed is high. As a result, an appropriate period of time according to the vehicle speed can be set.

Also, in the foregoing control apparatus and control method, the increased squeezing pressure may be reduced gradually.

Accordingly, the squeezing pressure can be reduced while inhibiting the transmission belt from slipping, which tends to otherwise occur when the vehicle is being braked. As a result, the degree to which the durability of the belt is adversely effected can be lessened.

Yet another aspect of the invention relates to a control apparatus of a continuously variable transmission having a pair of pulleys with variable groove widths, and a transmission belt which is wound around the pair of pulleys and transmits power by frictional force. This control apparatus includes a first control portion that increases squeezing pressure applied to the transmission belt when a footbrake switch that detects a brake operation of a vehicle is turned on; a determining portion that determines whether the vehicle is being braked suddenly, and a second control portion that reduces the increased squeezing pressure when it is not determined that the vehicle is being braked suddenly within a predetermined period of time after the brake switch was turned on.

Also, still another aspect of the invention relates to a control method of a continuously variable transmission having a pair of pulleys with variable groove widths, and a transmission belt which is wound around the pair of pulleys and transmits power by frictional force. This control method includes the steps of increasing squeezing pressure applied to the transmission belt when a footbrake switch that detects a brake operation of a vehicle is turned on; determining whether the vehicle is being braked suddenly; and reducing the increased squeezing pressure when it is not determined that the vehicle is being braked suddenly within a predetermined period of time after the brake switch was turned on.

According to the control apparatus and control method of a continuously variable transmission described above, the squeezing pressure applied to the transmission belt is increased when the brake switch that detects a brake operation of the vehicle is turned on, and whether the vehicle is being suddenly braked is determined. If it is not determined that the vehicle is being suddenly braked within a predetermined period of time after the brake switch was turned on, the increased squeezing pressure is reduced. As a result, the belt squeezing pressure can be reduced when the vehicle is being braked gradually. Therefore, more squeezing pressure than is necessary can be inhibited from being applied to the belt. Hence, a control apparatus and control method of a continuously variable transmission can be provided which can reduce the extent to which fuel efficiency and belt durability are adversely effected.

Here, whether or not the vehicle is being suddenly braked may be determined based on the deceleration of the vehicle. Furthermore, whether or not the vehicle is being suddenly braked may be determined based on the brake operation amount.

Also, in the foregoing control apparatus and control method, the increased squeezing pressure may be reduced to a squeezing pressure that is applied to the transmission belt when the footbrake switch is off.

This makes it possible to reduce the extent to which the fuel efficiency and belt durability in a vehicle provided with the continuously variable transmission is adversely effected.

Also, in the foregoing control apparatus and control method, the squeezing pressure may be reduced to a squeezing pressure that is higher than the squeezing pressure applied to the transmission belt when the footbrake switch is off and lower than the increased squeezing pressure.

This not only makes it possible to reduce the extent to which the fuel efficiency and belt durability in a vehicle provided with the continuously variable transmission is adversely effected, but also reduces belt slippage when the operating amount of the brake is increased so that the vehicle is braked suddenly.

The invention also provides a program by which a computer realizes the control method of a continuously variable transmission. Further, the invention provides a recording medium that can be read by a computer and on which a program by which a computer realizes the control method of a continuously variable transmission is recorded.

According to the foregoing program and the recording medium on which that program is stored, the control method of a continuously variable transmission can be realized using a computer (either a general computer or a special computer).

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 6 is a diagram of a brake system;

DETAILED DESCRIPTION OF THE EMBODIMENTS

Figure 1:
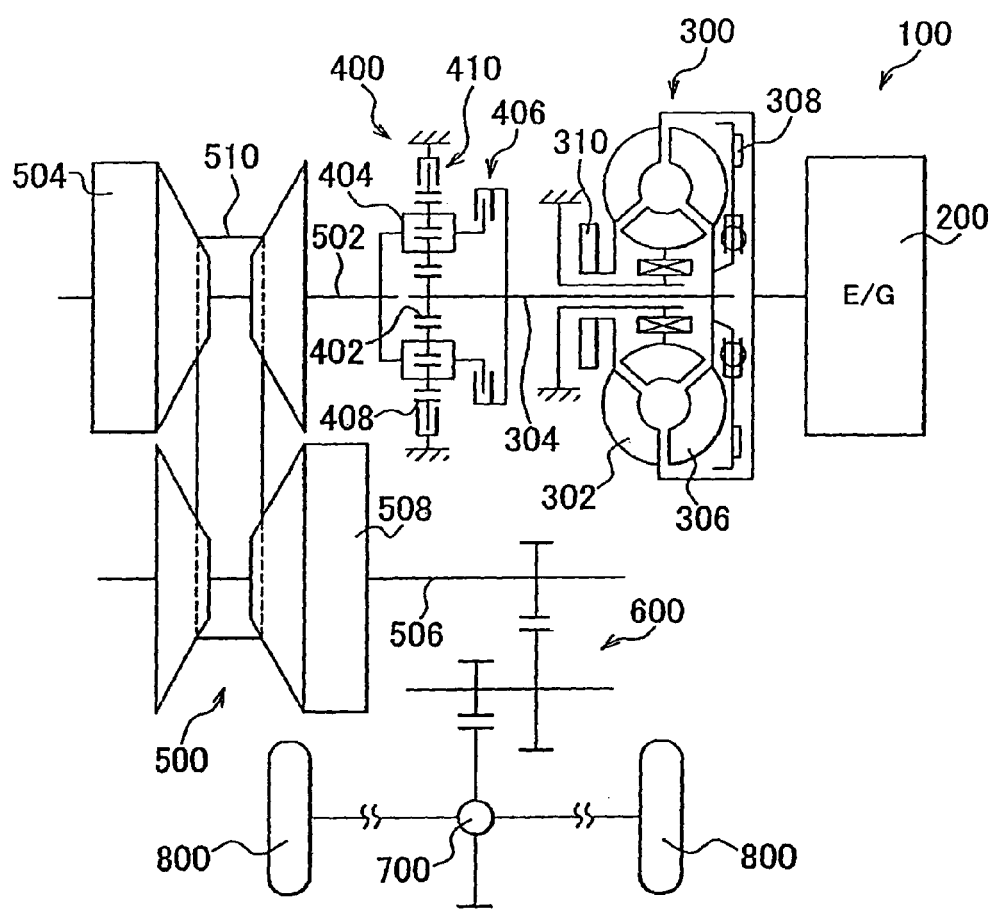
FIG. 1 is a skeleton view of a vehicle provided with an ECU which serves as a control apparatus according to a first example embodiment of the invention.

Hereinafter, example embodiments of the invention will be described in detail with reference to the accompanying drawings. In the following description, like parts with be denoted by like reference numerals. Like parts will also be referred to by the same nomenclature and will have the same function. Therefore, detailed descriptions of those parts will not be repeated.

A vehicle provided with a control apparatus according to a first example embodiment of the invention will now be described with reference to FIG. 1. Output of an engine 200 in a drive system 100 provided in a vehicle is input to a belt-type continuously variable transmission (hereinafter also simply referred to as "CVT") 500 via a torque converter 300 and a forward-reverse switching apparatus 400. Output from the CVT 500 is transmitted to reduction gears 600 and a differential gear unit 700, and then distributed to left and right driving wheels 800. The drive system 100 is controlled by an ECU (Electronic Control Unit) 900 which will be described later. The control apparatus according to this example embodiment is realized by the ECU 900 executing a program stored in ROM (Read Only Memory) 930 of the ECU 900, for example.

The torque converter 300 includes a pump impeller 302 which is connected to a crankshaft of the engine 200, and a turbine runner 306 which is connected to the forward-reverse switching apparatus 400 via a turbine shaft 304. A lockup clutch 308 is provided between the pump impeller 302 and the turbine runner 306. The lockup clutch 308 is engaged or released by switching a supply of hydraulic pressure to or from an engaging side fluid chamber and a release side fluid chamber.

When the lockup clutch 308 is fully engaged the pump impeller 302 and the turbine runner 306 are made to rotate together as a single unit. A mechanical oil pump 310 is provided with the pump impeller 302. This mechanical oil pump 310 generates hydraulic pressure used to control the shifting of the CVT 500, apply belt squeezing pressure on the belt, and supply lubrication oil to various parts.

The forward-reverse switching apparatus 400 includes a double pinion type planetary gear set. The turbine shaft 304 of the torque converter 300 is connected to a sun gear 402 of the planetary gear set, an input shaft 502 of the CVT 500 is connected to a carrier 404 of the planetary gear set, and the carrier 404 and the sun gear 402 are selectively connected together via a forward clutch 406. A ring gear 408 of the planetary gear set is selectively fixed to a housing via a reverse brake 410. The forward clutch 406 and the reverse brake 410 are frictionally engaged by a hydraulic cylinder. The input rotation speed of the forward clutch 406 is the same as the rotation speed of the turbine shaft 304, i.e., the turbine speed NT.

The forward-reverse switching apparatus 400 is controlled to a state for forward running by engaging the forward clutch 406 and releasing the reverse brake 410. In this state, forward driving force is transmitted to the CVT 500. The forward-reverse switching apparatus 400 is controlled to a state for running in reverse by engaging the reverse brake 410 and releasing the forward clutch 406. In this state, the input shaft 502 is rotated in the opposite direction as the turbine shaft 304, i.e., in reverse. As a result, reverse driving force is transmitted to the CVT 500. Releasing both the forward clutch 406 and the reverse brake 410 places the forward-reverse switching apparatus 400 in a neutral state in which the transmission of power is interrupted.

The CVT 500 includes a primary pulley 504 provided on the input shaft 502, a secondary pulley 508 provided on an output shaft 506, and a transmission belt 510 which is wound around the primary pulley 504 and the secondary pulley 508. Power is transmitted using frictional force between the pulleys and the transmission belt 510.

Each pulley is formed of a hydraulic cylinder, which enables the groove widths of the pulleys to be changed by controlling the hydraulic pressure in the hydraulic cylinders of the pulleys. When the groove width of the one of the pulleys changes, the winding radius of the transmission belt 510 around that pulley (also referred to as "pitch radius") also changes. The ratio of the pitch radius on the primary pulley 504 to the pitch radius on the secondary pulley 508 determines the speed ratio GR (i.e., speed ratio GR=primary pulley speed NIN/secondary pulley speed NOUN). This speed ratio GR changes in a continuous fashion as the radii of the two pulleys change relative to one another.

Figure 2:
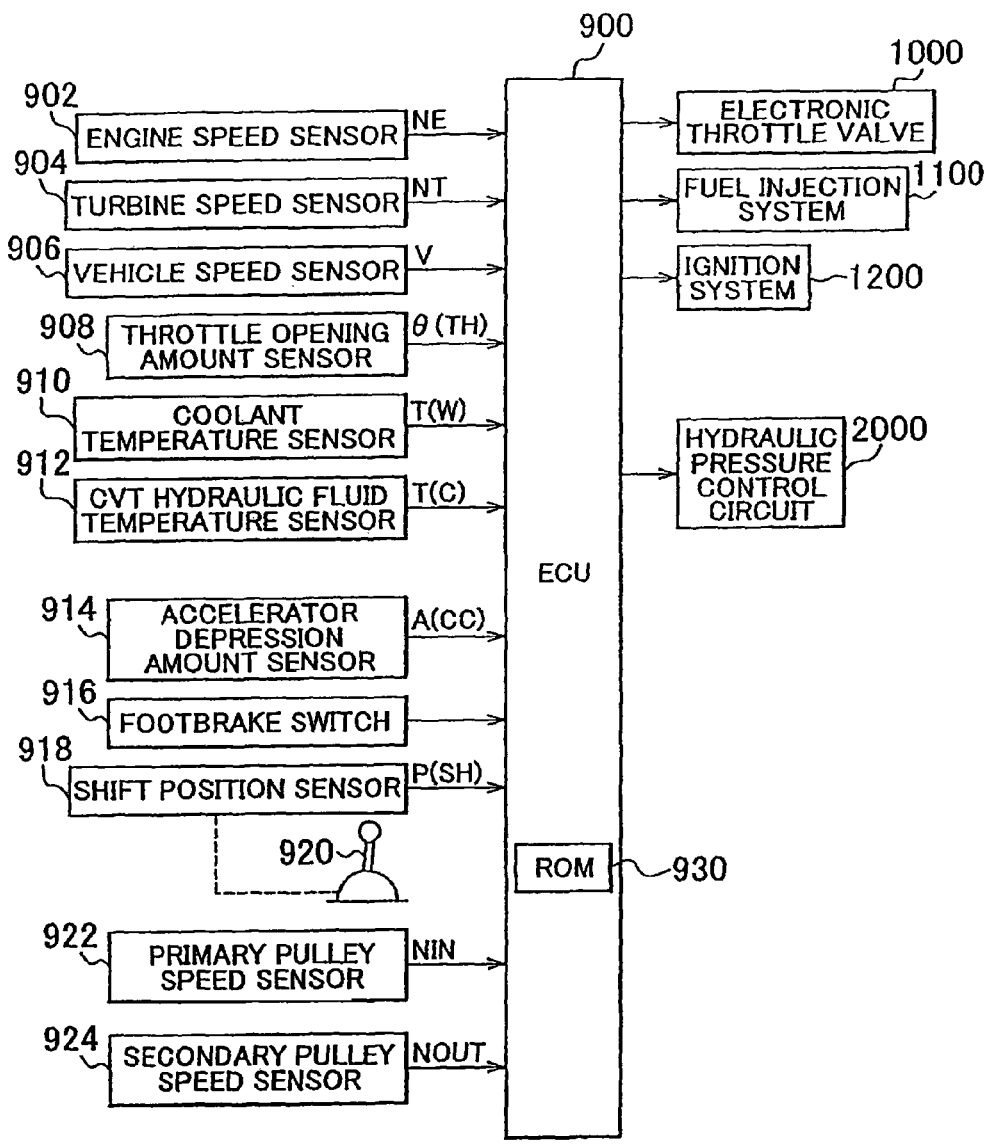
FIG. 2 is a control block diagram of the ECU which serves as the control apparatus according to the first example embodiment of the invention.

As shown in FIG. 2, the ECU 900 is connected to various sensors, including an engine speed sensor 902, a turbine speed sensor 904, a vehicle speed sensor 906, a throttle opening amount sensor 908, a coolant temperature sensor 910, a CVT hydraulic fluid temperature sensor 912, an accelerator depression amount sensor 914, a footbrake switch 916, a shift position sensor 918, a primary pulley speed sensor 922, and a secondary pulley speed sensor 924.

The engine speed sensor 902 detects the speed of the engine 200 (i.e., engine speed) NE. The turbine speed sensor 904 detects the rotation speed of the turbine shaft 304 (i.e., turbine speed) NT. The vehicle speed sensor 906 detects the vehicle speed V. The throttle opening amount sensor 908 detects an opening amount θ TH) of an electronic throttle valve. The coolant temperature sensor 910 detects a coolant temperature T (W) of the engine 200. The hydraulic fluid temperature sensor 912 detects a temperature T (C) of the hydraulic fluid in the CVT 500 and the like. The accelerator depression amount sensor 914 detects a depression amount A (CC) of an accelerator pedal. The footbrake switch 916 detects whether a brake pedal is being operated. When the brake pedal is being operated, the footbrake switch 916 is on. When the brake pedal is not being operated, the footbrake switch 916 is off.

The shift position sensor 918 detects a position P (SH) of a shift lever 920 by determining whether a contact point provided in a position corresponding to the shift position is on or off. The primary pulley speed sensor 922 detects the rotation speed NIN of the primary pulley 504, and the secondary pulley speed sensor 924 detects the rotation speed NOUT of the secondary pulley 508. Signals indicative of the detection results from the various sensors are output to the ECU 900. The turbine speed NT matches the primary pulley speed NIN when the vehicle is traveling forward with the forward clutch 406 engaged. The vehicle speed V is a value that corresponds to the secondary pulley speed NOUT. Therefore, when the vehicle is stopped and the forward clutch 406 is engaged, the turbine speed NT is zero.

The ECU 900 includes a CPU (Central Processing Unit), memory, an input/output interface, and the like. The CPU performs signal processing according to programs stored in memory to execute various controls such as output control of the engine 200, shift control of the CVT 500, belt squeezing pressure control, engage/release control of the forward clutch 406, and engage/release control of the reverse brake 410.

Output control of the engine 200 is performed by an electronic throttle valve 1000, a fuel injection system 1100, an ignition system 1200, and the like. The shift control of the CVT 500, the belt squeezing pressure control, the engage/release control of the forward clutch 406, and the engage/release control of the reverse brake 410 are all performed by a hydraulic pressure control circuit 2000.

Part the hydraulic pressure control circuit 2000 will now be described with reference to FIG. 3. Hydraulic pressure generated by the oil pump 310 is supplied via a line pressure fluid passage 2002 to a primary regulator valve 2100, a modulator valve (1) 2310, and a modulator valve (3) 2330.

Control pressure is selectively supplied from either an SLT linear solenoid valve 2200 or an SLS linear solenoid valve 2210 to the primary regulator valve 2100. In this example embodiment, both the SLT linear solenoid valve 2200 and the SLS linear solenoid valve 2210 are normally open solenoid valves (i.e., solenoid valves which output maximum hydraulic pressure when de-energized). The SLT linear solenoid valve 2200 and the SLS linear solenoid valve 2210 may also be normally closed solenoid valves (i.e., solenoid valves which output minimum (zero) hydraulic pressure when de-energized).

A spool of the primary regulator valve 2100 slides up and down in response to the supplied control pressure. As a result, the primary regulator valve 2100 regulates (adjusts) the hydraulic pressure generated by the oil pump 310. The hydraulic pressure that has been regulated by the primary regulator valve 2100 is used as the line pressure PL. In this example embodiment, the line pressure PL progressively increases as the control pressure supplied to the primary regulator valve 2100 increases. Incidentally, die line pressure PL may also be made to progressively decrease as the control pressure supplied to the primary regulator valve 2100 increases.

Hydraulic pressure that has been adjusted by the modulator valve (3) 2330 is supplied with the line pressure PL as the base pressure to the SLT linear solenoid valve 2200 and the SLS linear solenoid valve 2210.

The SLT linear solenoid valve 2200 and the SLS linear solenoid valve 2210 generate control pressure according to a current value determined by a duty signal output from the ECU 900.

A control valve 2400 selects the control pressure to be supplied to the primary regulator valve 2100 from among the control pressure (output hydraulic pressure) of the SLT linear solenoid valve 2200 and the control pressure (output hydraulic pressure) of the SLS linear solenoid valve 2210.

Figure 3:
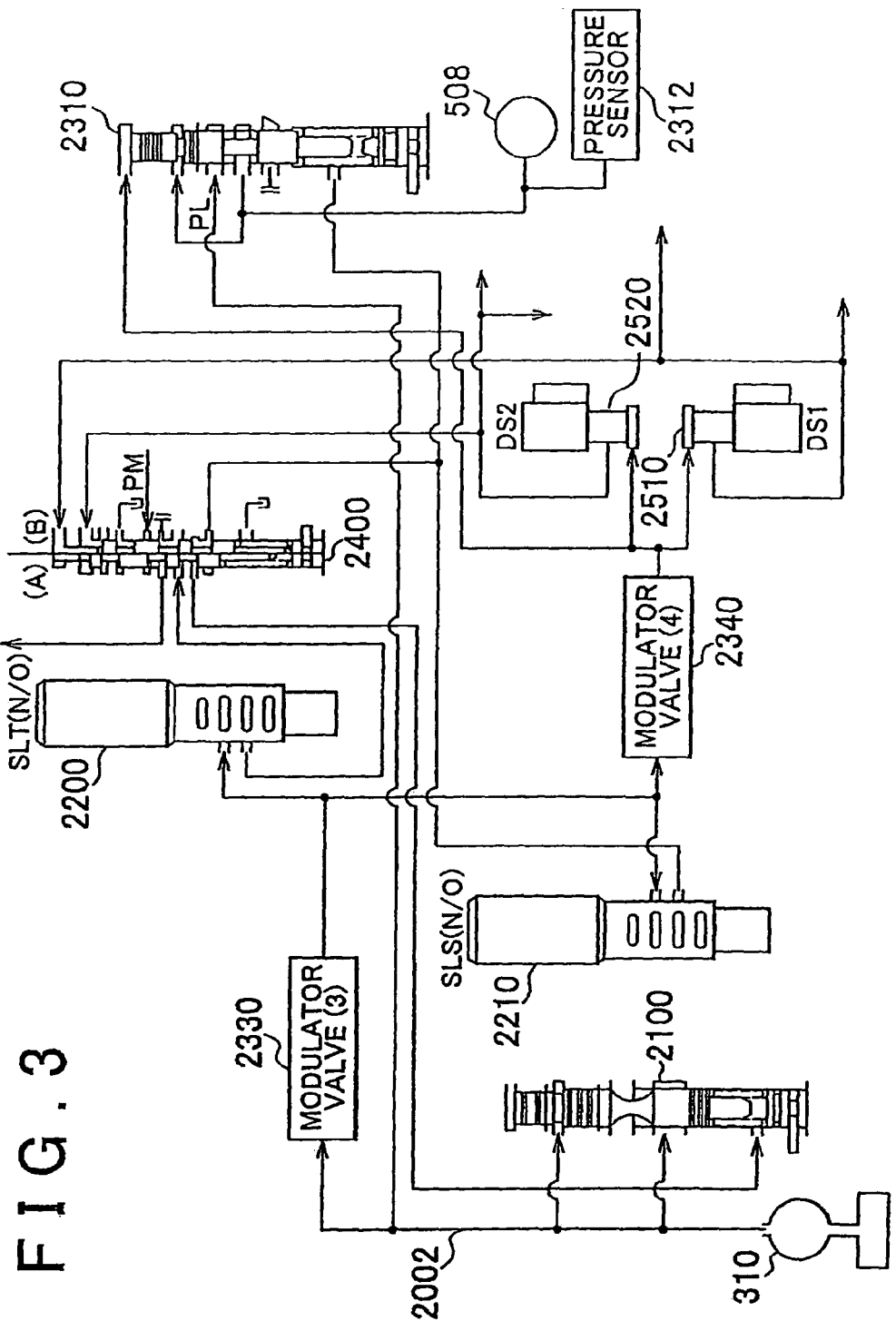
FIG. 3 is a diagram (part 1) of a hydraulic pressure control circuit that is controlled by the control apparatus according to the first example embodiment of the invention.

When the spool of the control valve 2400 is in state (A) (i.e., the state shown on the left side of the valve) in FIG. 3, control pressure is supplied to the primary regulator valve 2100 from the SLT linear solenoid valve 2200. That is, the line pressure PL is controlled according to the control pressure of the SLT linear solenoid valve 2200.

When the spool of the control valve 2400 is in state (B) (i.e., the state shown on the right side of the valve) in FIG. 3, control pressure is supplied to the primary regulator valve 2100 from the SLS linear solenoid valve 2210. That is, the line pressure PL is controlled according to the control pressure of the SLS linear solenoid valve 2210.

When the spool of the control valve 2400 is in state (B) in FIG. 3, control pressure of the SLT linear solenoid valve 2200 is supplied to a manual valve 2600 which will be described later.

The spool of the control valve 2400 is urged in one direction by a spring and hydraulic pressure from a shift control duty solenoid (1) 2510 and a shift control duty solenoid (2) 2520 is supplied from the other direction, i.e., the direction opposite the urging force of the spring.

When hydraulic pressure is supplied to the control valve 2400 from both the shift control duty solenoid (1) 2510 and the shift control duty solenoid (2) 2520, the spool of the control valve 2400 is shifted into state (B) in FIG. 3.

When hydraulic pressure is not being supplied to the control valve 2400 from at least one of the shift control duty solenoid (1) 2510 and the shift control duty solenoid (2) 2520, the spool of the control valve 2400 is shifted into state (A) in FIG. 3 by the urging force of the spring.

Hydraulic pressure that has been adjusted by a modulator valve (4) 2340 is supplied to the shift control duty solenoid (1) 2510 and the shift control duty solenoid (2) 2520. The modulator valve (4) 2340 adjusts the hydraulic pressure supplied from the modulator valve (3) 2330 to a constant pressure.

The modulator valve (1) 2310 outputs hydraulic pressure that has been adjusted with the line pressure PL as the base pressure. The hydraulic pressure output from the modulator valve (1) 2310 is supplied to the hydraulic cylinder of the secondary pulley 508. Incidentally, that hydraulic pressure is a hydraulic pressure that will not allow the transmission belt 510 to slide.

A spool that is slidable in the axial direction and a spring that urges that spool in one direction are provided in the modulator valve (1) 2310. The modulator valve (1) 2310 adjusts the line pressure PL introduced to the modulator valve (1) 2310 with the output hydraulic pressure of the SLS linear solenoid valve 2210 which is duty controlled by the ECU 900 as the pilot pressure. The hydraulic pressure that has been adjusted by the modulator valve (2) is supplied to the hydraulic cylinder of the secondary pulley 508. The belt squeezing pressure is increased or decreased according to the output hydraulic pressure from the modulator valve (1) 2310.

The SLS linear solenoid valve 2210 is controlled according to a map having the accelerator depression amount A (CC) and the speed ratio GR as parameters such that belt squeezing pressure which does not allow the belt to slip is generated. More specifically, exciting current to the SLS linear solenoid valve 2210 is controlled by a duty ratio corresponding to the belt squeezing pressure. In this example embodiment, when there is a sudden change in the transfer torque, such as during acceleration or deceleration, slipping of the belt may also be suppressed by increasing the belt squeezing pressure.

The hydraulic pressure supplied to the hydraulic cylinder of the secondary pulley 508 is detected by a pressure sensor 2312.

The manual valve 2600 will now be described with reference to FIG. 4. The manual valve 2600 is mechanically switched according to an operation of the shift lever 920. When the manual valve 2600 is switched, the forward clutch 406 and the reverse brake 410 engage or release depending on the state of the manual valve 2600.

The shift lever 920 can be shifted into various positions, i.e., a "P" position for parking, an "R" position for running in reverse, an "N" position in which the transfer of power is interrupted, and "D" and "B" positions for forward running.

When the shift lever 920 is shifted into the "P" position or the "N" position, hydraulic pressure in the forward clutch 406 and the reverse brake 410 drains from the manual valve 2600 so the forward clutch 406 and the reverse brake 410 release.

When the shift lever 920 is shifted into the "R" position, hydraulic pressure is supplied from the manual valve 2600 to the reverse brake 410 so the reverse brake 410 engages, while hydraulic pressure in the forward clutch 406 drains from the manual valve 2600 so the forward clutch 406 releases.

Figure 4:
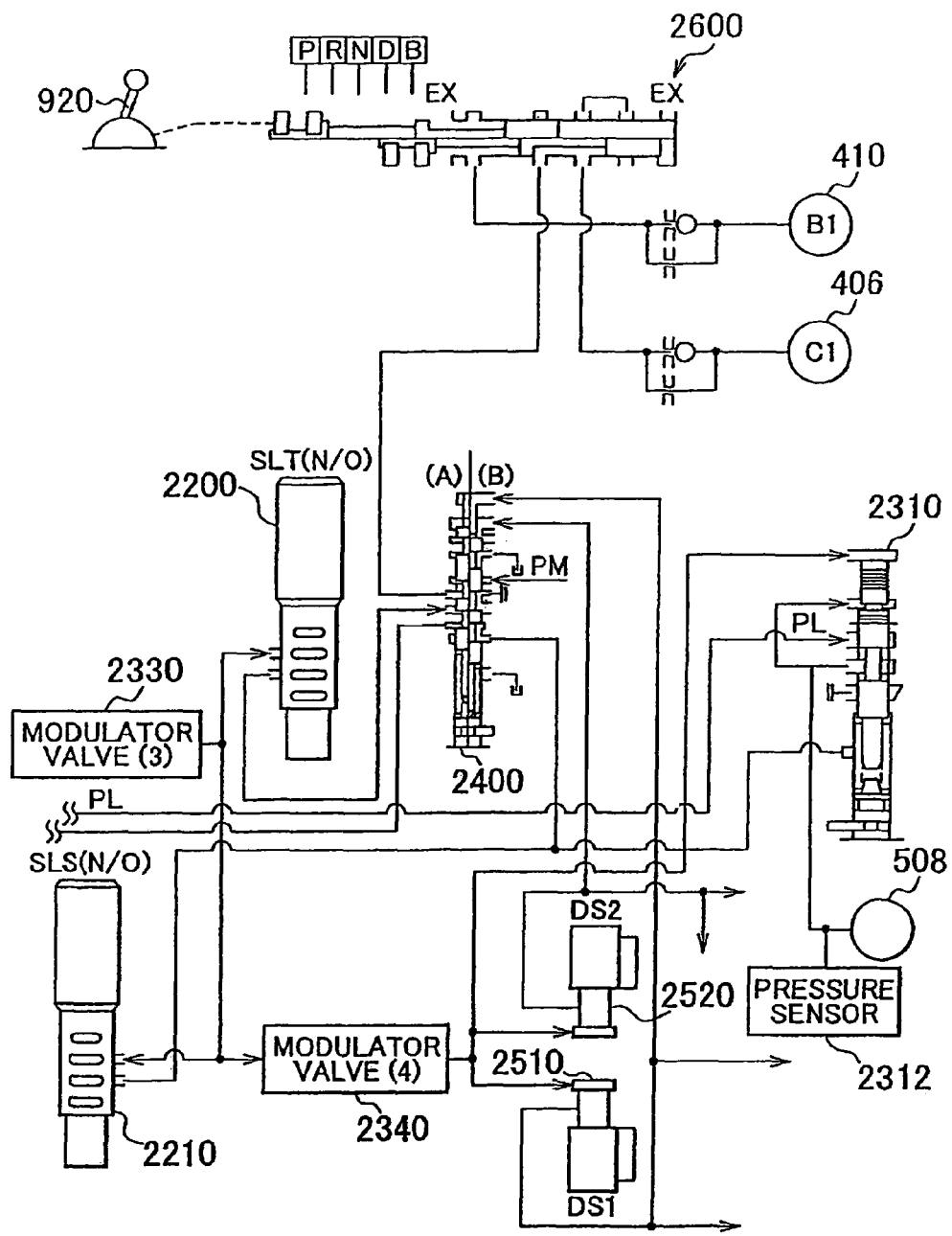
FIG. 4 is a diagram (part 2) of the hydraulic pressure control circuit that is controlled by the control apparatus according to the first example embodiment of the invention.

When the control valve 2400 is in state (A) (i.e., the state shown on the left side of the valve) in FIG. 4 while the shift lever 920 is in the "R" position, modulator pressure PM supplied from a modulator valve (2), not shown, is supplied to the manual valve 2600 via the control valve 2400. This modulator pressure PM keeps the reverse brake 410 engaged.

When the control valve 2400 is in state (B) (i.e., the state shown on the right side of the valve) in FIG. 4 while the shift lever 920 is in the "R" position, hydraulic pressure that has been adjusted by the SLT linear solenoid valve 2200 is supplied to the manual valve 2600. Adjusting the pressure with the SLT linear solenoid valve 2200 enables the reverse brake 410 to be engaged gradually, thus suppressing shock when the reverse brake 410 is engaged.

When the shift lever 920 is shifted into the "D" position or the "B" position, hydraulic pressure is supplied from the manual valve 2600 to the forward clutch 406 such that the forward clutch 406 engages, while hydraulic pressure in the reverse brake 410 drains from the manual valve 2600 so the reverse brake 410 releases.

When the control valve 2400 is in state (A) (i.e., the state shown on the left side of the valve) in FIG. 4 while the shift lever 920 is in the "D" or "B" position, modulator pressure PM supplied from the modulator valve (2), not shown, is supplied to the manual valve 2600 via the control valve 2400. This modulator pressure PM keeps the forward clutch 406 engaged.

When the control valve 2400 is in state (B) (i.e., the state shown on the right side of the valve) in FIG. 4 while the shift lever 920 is in the "D" or "B" position, hydraulic pressure that has been adjusted by the SLT linear solenoid valve 2200 is supplied to the manual valve 2600. Adjusting the pressure with the SLT linear solenoid valve 2200 enables the forward clutch 406 to be engaged gradually, thus suppressing shock when the forward clutch 406 is engaged.

The SLT linear solenoid valve 2200 normally controls the line pressure PL via the control valve 2400, and the SLS linear solenoid valve 2210 normally controls the belt squeezing pressure via the modulator valve (1) 2310.

On the other hand, when a neutral control executing condition that includes a condition in which the vehicle is stopped (i.e., the vehicle speed is zero) is satisfied while the shift lever 920 is in the "D" position, the SLT linear solenoid valve 2200 controls the engaging force of the forward clutch 406 so that it decreases. The SLS linear solenoid valve 2210 controls the belt squeezing pressure via the modulator valve (1) 2310, and also controls the line pressure PL instead of the SLT linear solenoid valve 2200.

When a garage shift, in which the shift lever 920 is shifted from the "N" position to the "D" position or the "R" position, is performed, the SLT linear solenoid valve 2200 controls the engaging force of the forward clutch 406 or the reverse clutch 410 so that the forward clutch 406 or the reverse brake 410 engages gradually. The SLS linear solenoid valve 2210 controls the belt squeezing pressure via the modulator valve (1) 2310, and also controls the line pressure PL instead of the SLT linear solenoid valve 2200.

The structure that performs shift control will now be described with reference to FIG. 5. Shift control is performed by controlling the supply and discharge of hydraulic pressure to and from the hydraulic cylinder of the primary pulley 504 using a ratio control valve (1) 2710 and a ratio control valve (2) 2720.

Both the ratio control valve (1) 2710 to which line pressure PL is supplied and the ratio control valve (2) 2720 which is connected to a drain are communicated with the hydraulic cylinder of the primary pulley 504.

The ratio control valve (1) 2710 is a valve used for executing an upshift, and is structured such that a flow path between an intake port to which line pressure PL is supplied and an output port which is communicated with the hydraulic cylinder of the primary pulley 504 is opened and closed by a spool.

A spring is arranged at one end of a spool of the ratio control valve (1) 2710. A port through which control pressure from the shift control duty solenoid (1) 2510 is supplied is formed in the end portion opposite the side that the spring is on such that the spool is sandwiched in between. Also, a port through which control pressure from the shift control duty solenoid (2) 2520 is supplied is formed in the end portion on the side where the spring is arranged.

Figure 5:
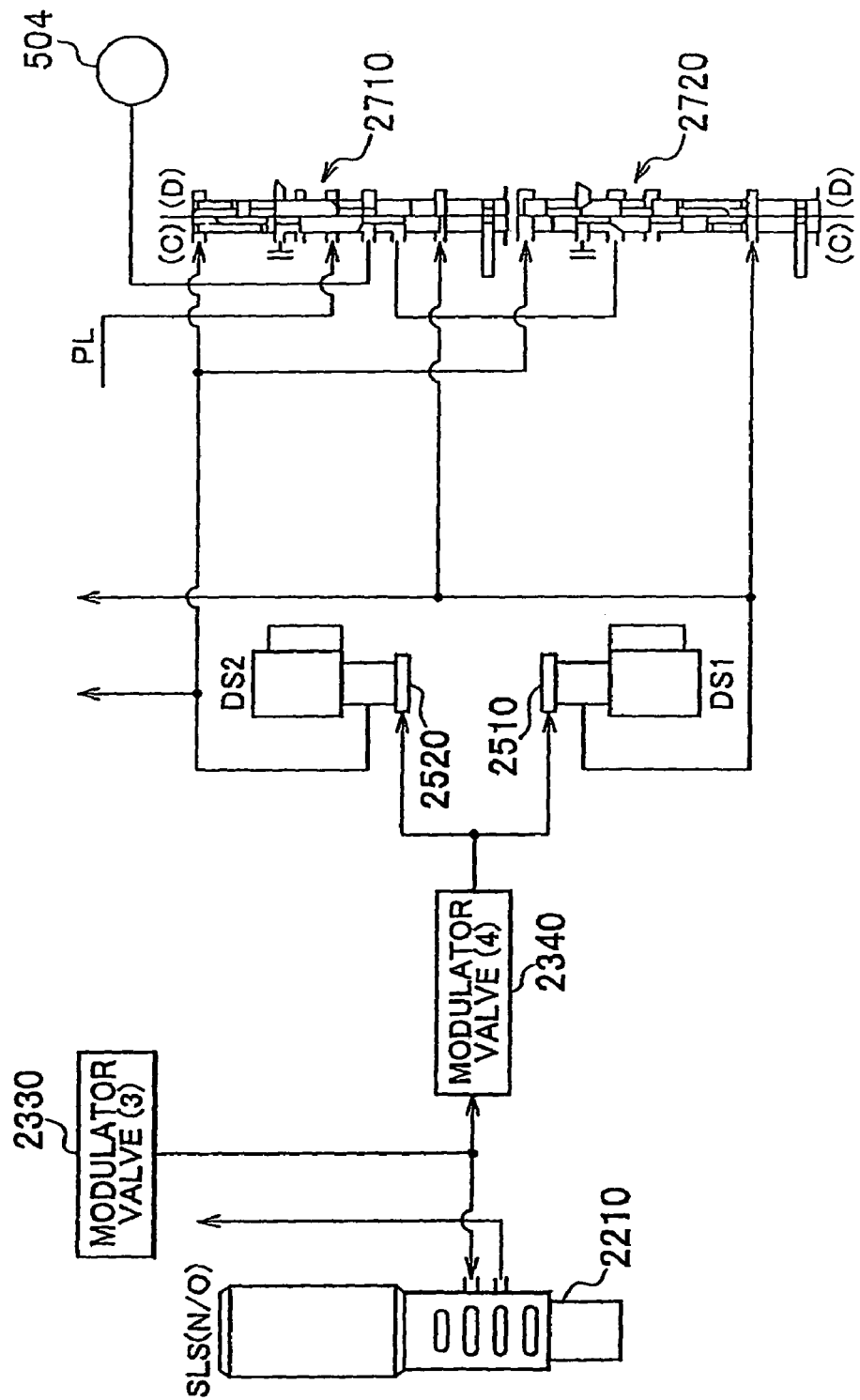
FIG. 5 is a diagram (part 3) of the hydraulic pressure control circuit that is controlled by the control apparatus according to the first example embodiment of the invention.

When the control pressure from the shift control duty solenoid (1) 2510 is increased and control pressure is not allowed to be discharged from the shift control duty solenoid (2) 2520, the spool of the ratio control valve (1) 2710 shifts to state (D) (the state shown on the right side of the valve) in FIG. 5.

In this state, the hydraulic pressure supplied to the hydraulic cylinder of the primary pulley 504 increases so the groove width of the primary pulley 504 becomes narrower. As a result, the speed ratio decreases, i.e., the transmission upshifts. Also, increasing the amount of operating fluid supplied at this time increases the shifting speed.

The ratio control valve (2) 2720 is a valve used for executing a downshift. Similar to the ratio control valve (1) 2710, a spring is arranged at one end of a spool of the ratio control valve (2) 2720. A port through which control pressure from the shift control duty solenoid (1) 2510 is supplied is formed in the end portion on the side where the spring is arranged. Also, a port through which the control pressure front the shift control duty solenoid (2) 2520 is supplied is formed in the end portion opposite the side that the spring is on such that the spool is sandwiched in between.

When the control pressure from the shift control duty solenoid (2) 2520 is increased and control pressure is not allowed to be discharged from the shift control duty solenoid (2) 2510, the spool of the ratio control valve (2) 2720 shifts to state (C) (the state shown on the left side of the valve) in FIG. 5.

In this state, hydraulic fluid is discharged from the hydraulic cylinder of the primary pulley 504 via the ratio control valve (1) 2710 and the ratio control valve (2) 2720 so the groove width of the primary pulley 504 increases. As a result, the speed ratio increases, i.e., the transmission downshifts. Also, increasing the amount of hydraulic fluid discharged at this time increases the shifting speed.

The brake system 1300 that applies braking force to the vehicle will now be further described with reference to FIG. 6. A brake pedal 1302 is linked to a master cylinder 1304. When the brake pedal 1302 is operated, hydraulic pressure corresponding to the brake operating amount is generated in the master cylinder 1304.

The hydraulic pressure generated in the master cylinder 1304 is supplied to calipers 1311 to 1314. Supplying this hydraulic pressure to the calipers 1311 to 1314 applies braking force to the vehicle. Incidentally, calipers that operate with electricity may be provided instead of calipers that operate with hydraulic pressure.

Figure 7:
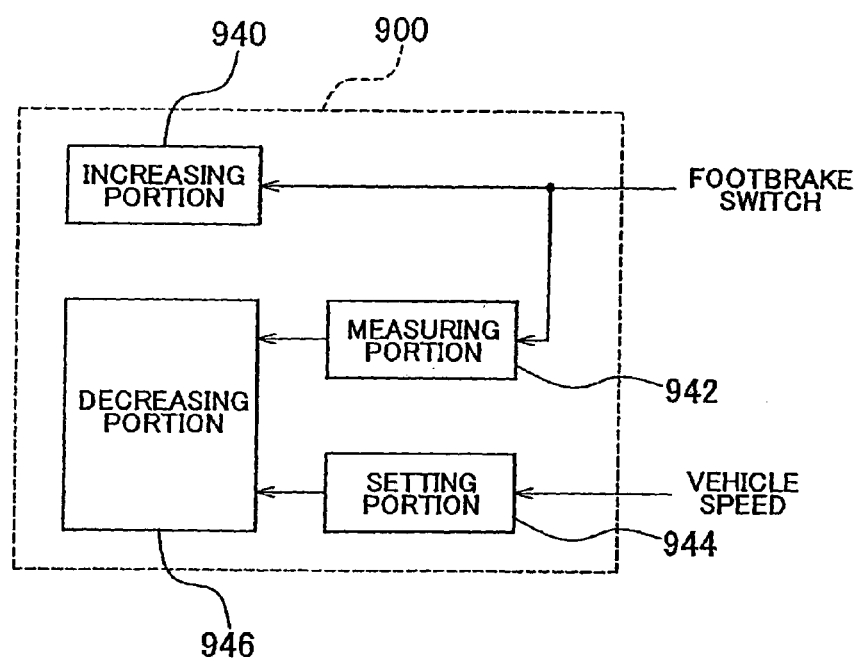
FIG. 7 is a functional block diagram of the ECU which serves as the control apparatus according to the first example embodiment of the invention.

The functions of the ECU 900 which serves as the control apparatus according to this example embodiment will further be described with reference to FIG. 7. The functions described below may be realized by hardware or software.

The ECU 900 includes an increasing portion 940, a measuring portion 942, a setting portion 944, and a decreasing portion 946. When the footbrake switch 916 turns on, the increasing portion 940 controls the SLS linear solenoid valve 2210 to increase the belt squeezing pressure to a value P (ON) which is greater than a normal value P (OFF) which is set as the belt squeezing pressure when the footbrake switch 916 is off.

The measuring portion 942 normally measures time, and also measures the time that has elapsed after the footbrake switch 916 was turned on by resetting (to 0) the time that was measured when the footbrake switch 916 is off. The setting means sets a threshold value T (0) so that the time is shorter when the vehicle speed is low than it is when the vehicle speed is high.

Then when the time elapsed after the footbrake switch 916 was turned on becomes equal to or greater than the threshold value T (0) that was set by the setting portion 944, the decreasing portion 946 controls the SLS linear solenoid valve 2210 to gradually reduce the belt squeezing pressure to the normal value P (OFF) that is set as the belt squeezing pressure when the footbrake switch 916 is off.

Figure 8:
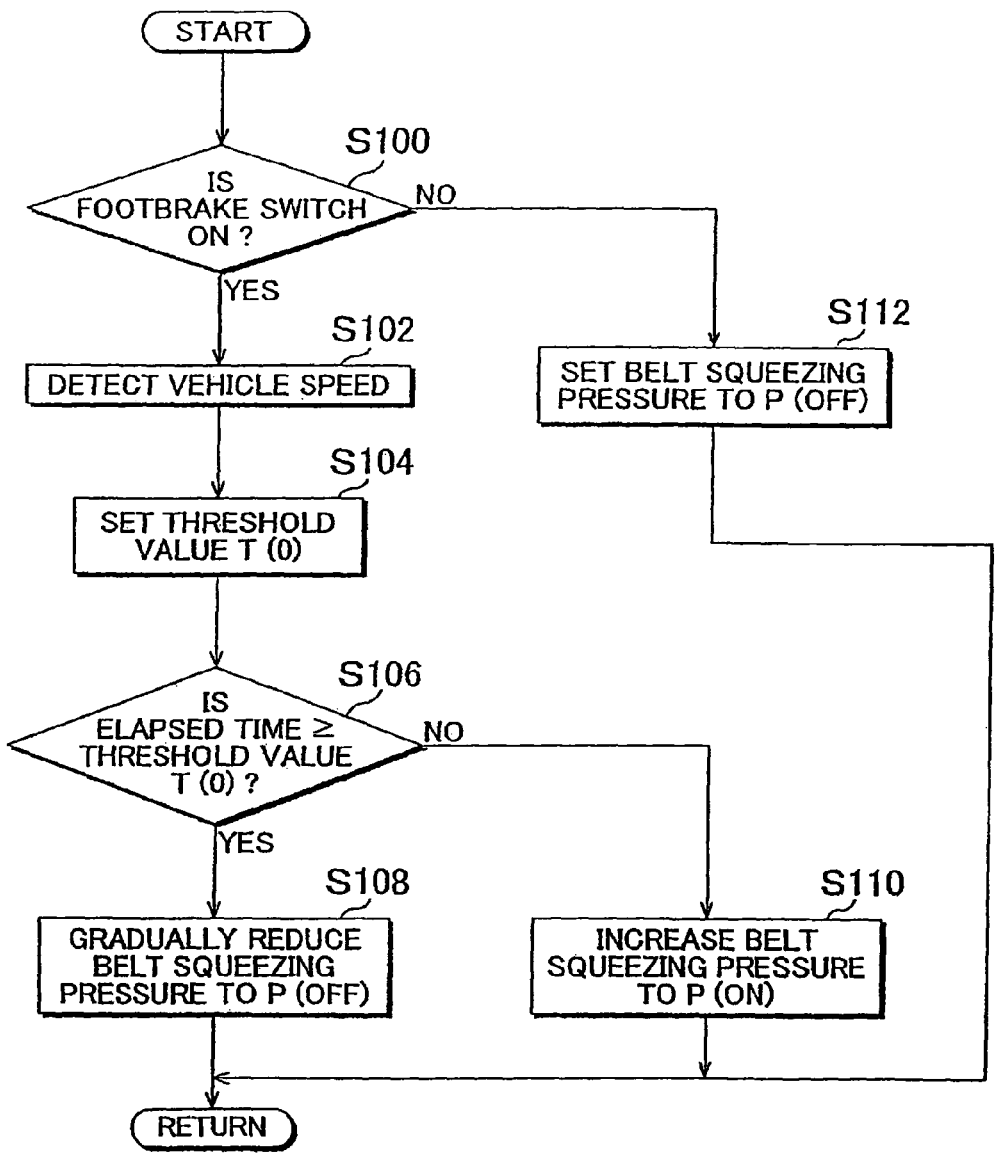
FIG. 8 is a flowchart illustrating the control structure of a program that is executed by the ECU which serves as the control apparatus according to the first example embodiment of the invention.

The control structure of the program executed by the ECU 900 which serves as the control apparatus according to this example embodiment will now be described with reference to FIG. 8. The program described below is repeatedly executed at predetermined cycles.

In step S100, the ECU 900 determines whether the footbrake switch 916 is on based on a signal output by the footbrake switch 916. If the footbrake switch 916 is on (i.e., YES in step S100), the process proceeds on to step S102. If not (i.e., NO in step S100), the process proceeds on to step S112.

In step S102, the ECU 900 detects the vehicle speed based on a signal output by the vehicle speed sensor 906. In step S104, the ECU 900 sets the threshold value T (0) so that the time is shorter when the vehicle speed is low than it is when the vehicle speed is high.

In step S106, the ECU 900 determines whether the time elapsed after the footbrake switch 916 was turned on is equal to or greater than the threshold value T (0). If the time elapsed after the footbrake switch 916 was turned on is equal to or greater than the threshold value T (0) (i.e., YES in step S106), then the process proceeds on to step S108. If not (i.e., NO in step S106), then the process proceeds on to step S110.

In step S108, the ECU 900 gradually reduces the belt squeezing pressure to the normal value P (OFF) that is set as the belt squeezing pressure when the footbrake switch 916 is off.

In step S110, the ECU 900 increases the belt squeezing pressure to the value P (ON) which is greater than the normal value P (OFF) that is set as the belt squeezing pressure when the footbrake switch 916 is off.

In step S112, the ECU 900 sets the belt squeezing pressure to the normal value P (OFF) that is set as the belt squeezing pressure when the footbrake switch 916 is off.

The operation of the ECU 900 which serves as the control apparatus according to this example embodiment and is based on the structure and flowchart described above will now be described.

While the vehicle is running, it is determined whether the footbrake switch 916 is on based on a signal output by the footbrake switch 916 (step S100). If the footbrake switch 916 is off (i.e., NO in step S100), that is, if the driver is not intending to brake the vehicle and is therefore is not operating the brake (i.e., not depressing the footbrake), the belt squeezing pressure is set to the normal value P (OFF) that is set as the belt squeezing pressure when the footbrake switch 916 is off (step S112).

When the footbrake switch 916 is on (i.e., YES in step S100), the vehicle speed is detected based on the signal output by the vehicle speed sensor 906 (step S102). The threshold value T (0) is set so that the time is shorter when the vehicle speed is low than it is when the vehicle speed is high (step S104).

When the footbrake switch 916 is on, it indicates that the driver is performing a brake operation with the intention of braking the vehicle. If a brake operation is performed to suddenly brake the vehicle, the rotation speed of the output shaft of the CVT 500 will slow down rapidly. At this time, the torque input to the transmission belt 510 becomes excessive so the transmission belt 510 may slip.

Therefore, immediately after the footbrake switch 916 is turned on, i.e., when the time passed after the footbrake switch 916 was turned on is less than the threshold value T (0) (i.e., NO in step S106), the belt squeezing pressure is increased to the value P (ON) which is greater than the normal value P (OFF) that is set as the belt squeezing pressure when the footbrake switch 916 is off, in consideration of the possibility that the vehicle may be braked suddenly (step S110).

When the vehicle is braked gradually, the torque input to the transmission belt 510 does not become excessive. Therefore, there is little need to increase the belt squeezing pressure. Here, when the vehicle is braked suddenly, the brake operation is not performed for an extended period time. Therefore, if the brake operation is performed for an extended period of time, it may be determined that the vehicle is being braked gradually not suddenly.

Therefore, if the time elapsed after the footbrake switch 916 was turned on is equal to or greater than the threshold T (0) (i.e., YES in step S106), it indicates that the vehicle is being braked gradually so the increased belt squeezing pressure is gradually reduced to the normal value P (OFF) that is set as the belt squeezing pressure when the footbrake switch 916 is off (step S108).

Accordingly, more belt squeezing pressure than is necessary can be inhibited from being applied to the transmission belt 510. Therefore, a decrease in fuel efficiency and a reduction in durability of the transmission belt 510, which result from increased belt squeezing pressure, can be reduced.

As described above, with the ECU that serves as the control apparatus according to this example embodiment, when the footbrake switch turns on, the belt squeezing pressure applied to the transmission belt is increased. If the time elapsed after the footbrake switch was turned on is equal to or greater than the threshold value T (0), the increased belt squeezing pressure is gradually reduced. Accordingly, more belt squeezing pressure than is necessary can be inhibited from being applied to the transmission belt, which enables a decrease in fuel efficiency and a reduction in durability of the transmission belt, which result from increased belt squeezing pressure, to be reduced.

Hereinafter, a second example embodiment of the invention will be described. This example embodiment differs from the first example embodiment described above in that the increased belt squeezing pressure is reduced to a value P (M) (P (M)<P (ON)) which is greater than the normal value P (OFF) when the time elapsed after the footbrake switch was turned on is equal to or greater than the threshold value T (0). The other structure, and functions thereof, of the second example embodiment are the same as those of the first example embodiment so a detailed description thereof will not be repeated here.

Figure 9:
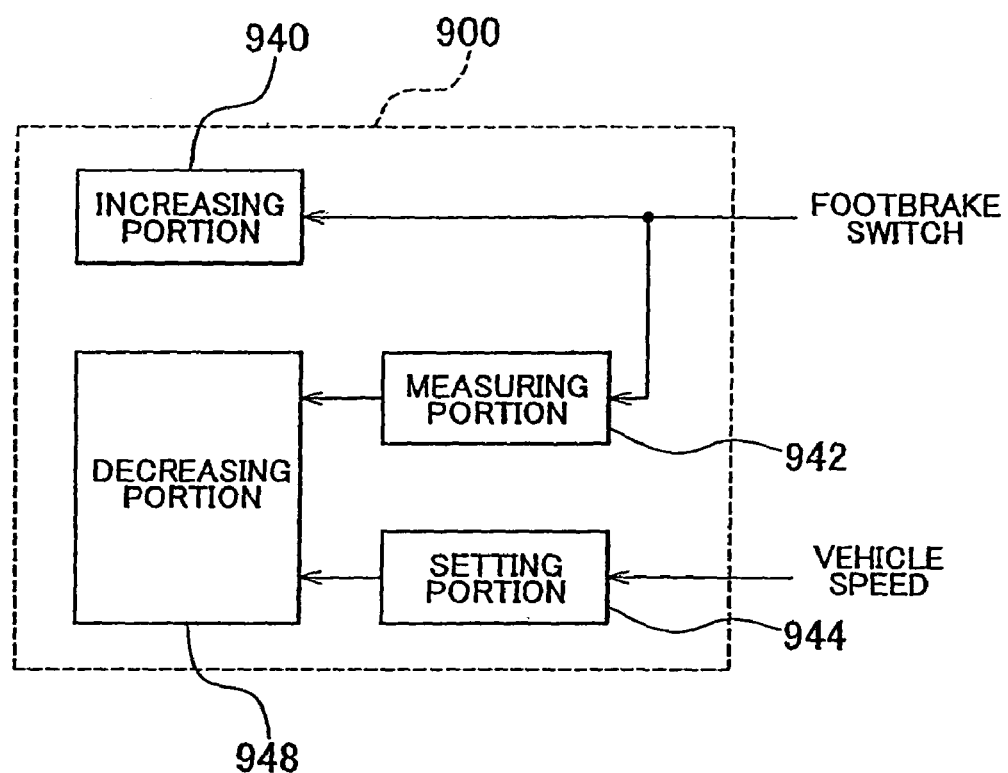
FIG. 9 is a functional block diagram of an ECU which serves as a control apparatus according to a second example embodiment of the invention.

The functions of the ECU 900 which serves as the control apparatus according to this example embodiment will further be described with reference to FIG. 9. The functions described below may be realized by hardware or software. Also, the structure in the second example embodiment that is the same as the structure in the first example embodiment will be denoted by the same reference numerals so a detailed description of that structure will not be repeated here.

When the time elapsed after the footbrake switch 916 was turned on becomes equal to or greater than the threshold value T (0) that was set by the setting portion 944, a decreasing portion 948 of the ECU 900 which serves as the control apparatus according to this example embodiment controls the SLS linear solenoid valve 2210 to gradually reduce the belt squeezing pressure to the value P (M) which is larger than the normal value P (OFF) that is set as the belt squeezing pressure when the footbrake switch 916 is off.

Figure 10:
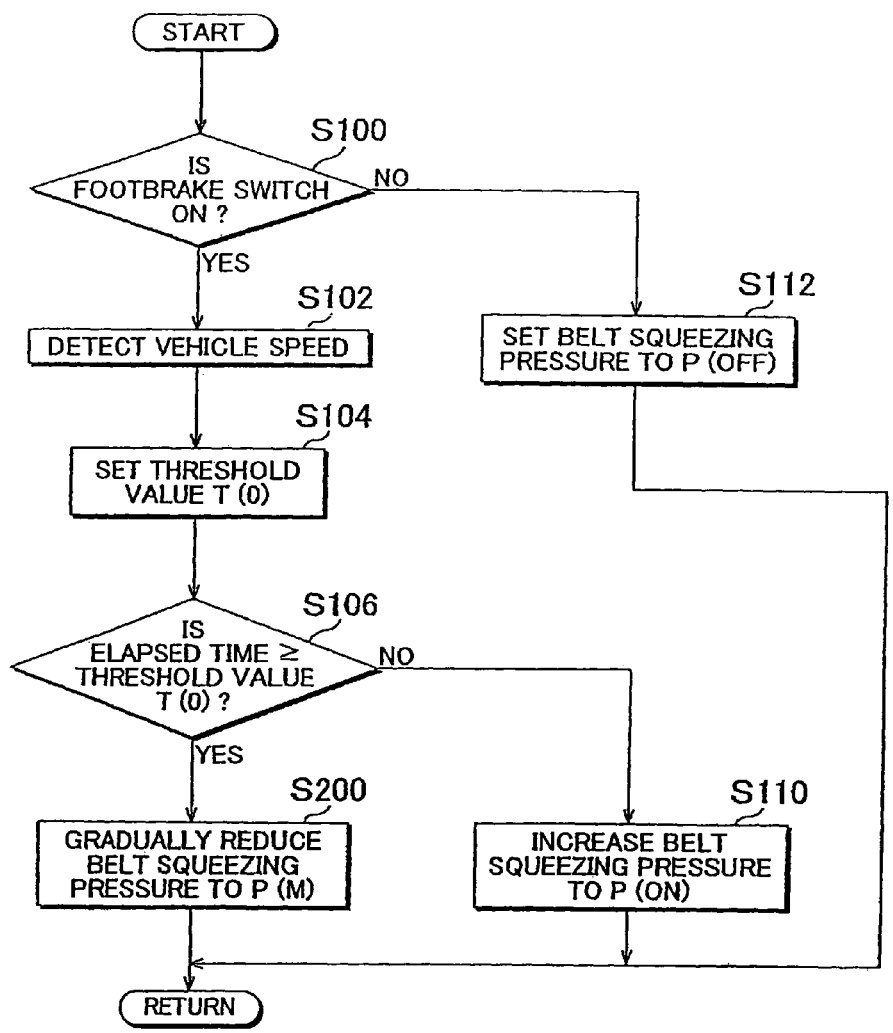
FIG. 10 is a flowchart illustrating the control structure of a program that is executed by the ECU which serves as the control apparatus according to the second example embodiment of the invention.

The control structure of a program executed by the ECU 900 which serves as the control apparatus according to this example embodiment will now be described with reference to FIG. 10. The program described below is repeatedly executed in predetermined cycles. Also, the steps in this program that are the same as steps in the program in the first example embodiment described above will be denoted by the same step numbers so detailed descriptions of those steps will not be repeated.

In step S200, the ECU 900 gradually reduces the belt squeezing pressure to the value P (M) which is greater than the normal value P (OFF) that is set as the belt squeezing pressure when the footbrake switch 916 is off.

Accordingly, in addition to the same effects obtained in the first example embodiment described above, it is also possible to inhibit the transmission belt 510 from slipping when gradual braking turns into sudden braking (i.e., when the operation amount of the footbrake during gradual braking is suddenly increased). As a result, a decrease in belt durability can be reduced.

Hereinafter, a third example embodiment of the invention will be described. This third example embodiment differs from the first example embodiment described above in that the increased belt squeezing pressure is reduced to the normal value P (OFF) when it is not determined that the vehicle is in a sudden braking state within a predetermined period of time after the footbrake switch was turned on. The other structure, and functions thereof, of the third example embodiment are the same as those of the first example embodiment described above so detailed descriptions thereof will not be repeated here.

Figure 11:
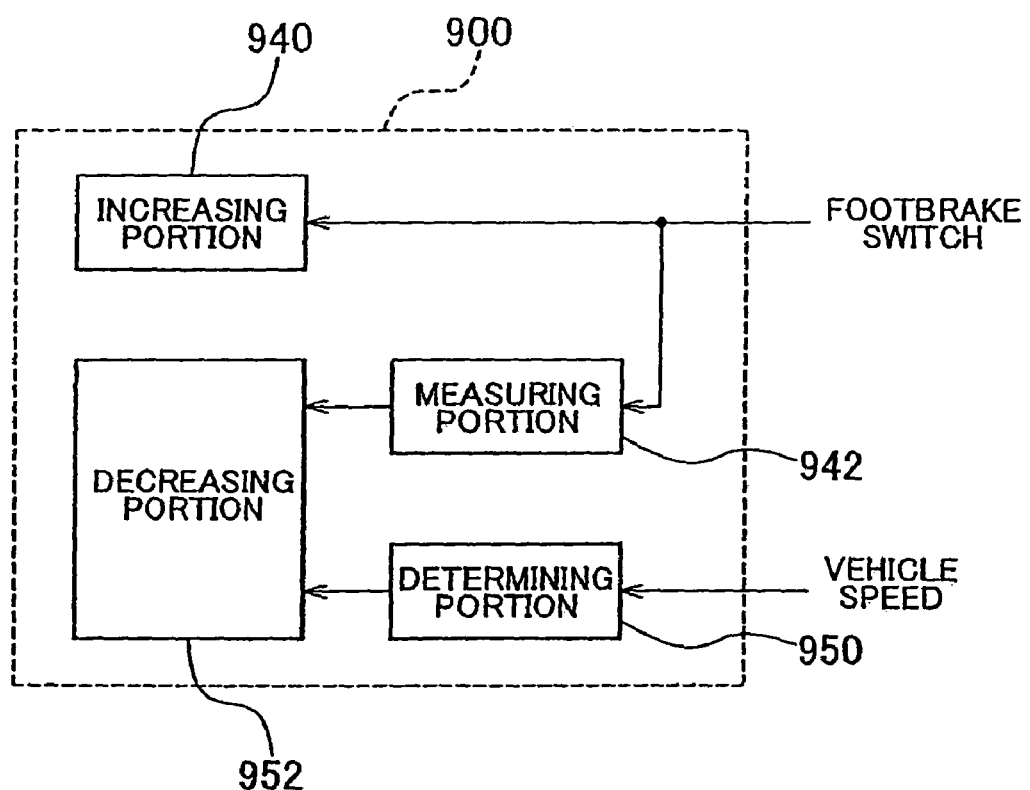
FIG. 11 is a functional block diagram of an ECU which serves as a control apparatus according to a third example embodiment of the invention.

The functions of the ECU 900 which serves as the control apparatus according to this example embodiment will further be described with reference to FIG. 11. The functions described below may be realized by hardware or software. Also, the structure in the second example embodiment that is the same as the structure in the first example embodiment will be denoted by the same reference numerals so a detailed description of that structure will not be repeated here.

The ECU 900 includes a determining portion 950 and a decreasing portion 952 in addition to the increasing portion 940 and the measuring portion 942. The determining portion 950 determines that the vehicle is rapidly decelerating when the deceleration obtained by differentiating the vehicle speed is equal to or greater than a predetermined value. In this example embodiment, deceleration is calculated as a positive value.

If it is not determined that the vehicle is rapidly decelerating within a predetermined period of time after the footbrake switch 916 is turned on, the decreasing portion 952 in this example embodiment controls the SLS linear solenoid valve 2210 to gradually reduce the belt squeezing pressure to the normal value P (OFF) that is set as the belt squeezing pressure when the footbrake switch 916 is off.

Figure 12:
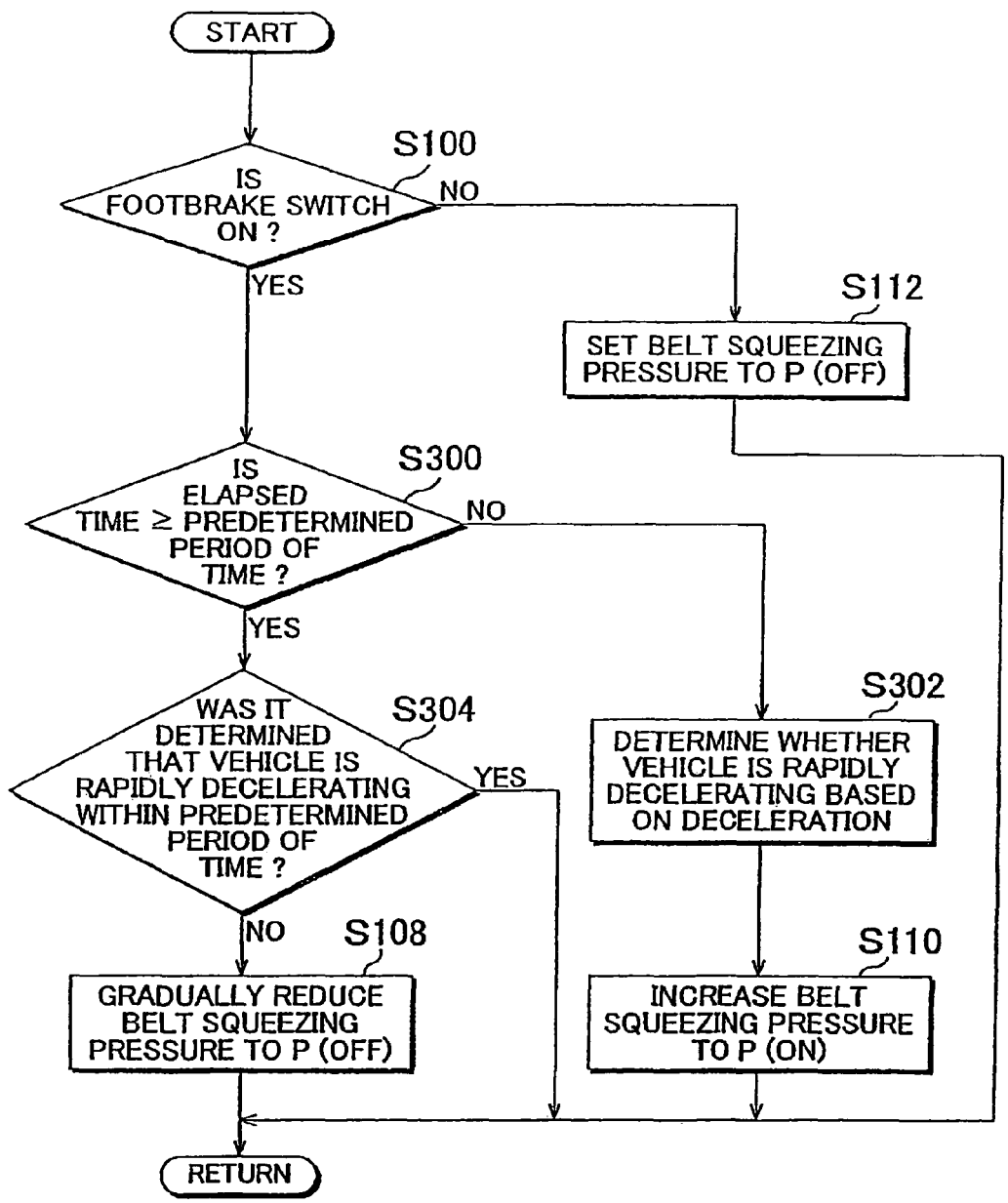
FIG. 12 is a flowchart illustrating the control structure of a program that is executed by the ECU which serves as the control apparatus according to the third example embodiment of the invention.

The control structure of a program executed by the ECU 900 which serves as the control apparatus according to this example embodiment will now be described with reference to FIG. 12. The program described below is repeatedly executed in predetermined cycles. Also, the steps in this program that are the same as steps in the program in the first example embodiment described above will be denoted by the same step numbers so detailed descriptions of those steps will not be repeated.

In step S300, the ECU 900 determines whether the time elapsed after the footbrake switch 916 was turned on is equal to or greater than a predetermined period of time. If the time elapsed after the footbrake switch 916 was turned on is equal to or greater than the predetermined period of time (i.e., YES in step S300), the process proceeds on to step S304. If not (i.e., NO in step S300), the process proceeds on to step S302.

In step S302, the ECU 900 determines whether the vehicle is rapidly decelerating based on whether the deceleration obtained by differentiating the vehicle speed is equal to or greater than a predetermined value.

In step S304, the ECU 900 determines whether it was determined that the vehicle is rapidly decelerating within a predetermined period of time after the footbrake switch 916 was turned on. If it is determined that the vehicle is rapidly decelerating within a predetermined period of time after the footbrake switch 916 was turned on (i.e., YES in step S304), this cycle of the routine ends. If not (i.e., NO in step S304), the process proceeds on to step S108.

The operation of the ECU 900 which serves as the control apparatus according to this example embodiment and is based on the structure and flowchart described above will now be described.

While the vehicle is running, it is determined whether the footbrake switch 916 is on based on a signal output by the footbrake switch 916 (step S100). If the footbrake switch 916 is off (i.e., NO in step S100), that is, if the driver is not intending to brake the vehicle and is therefore is not operating the brake (i.e., not depressing the footbrake), the belt squeezing pressure is set to the normal value P (OFF) that is set as the belt squeezing pressure when the footbrake switch 916 is off (step S112).

When the footbrake switch 916 is on (i.e., YES in step S100), it is determined whether the time elapsed after the footbrake switch 916 was turned on is equal to or greater than a predetermined period of time (step S300).

If the time elapsed after the footbrake switch 916 was turned on is within a predetermined period of time after the footbrake switch 916 was turned on (i.e., NO in step S300), it is then determined whether the vehicle is rapidly decelerating based on whether the deceleration obtained by differentiating the vehicle speed is equal to or greater than a predetermined value (step S302).

A certain amount of time is required to correctly determine whether the vehicle is rapidly decelerating. Therefore, immediately after the footbrake switch 916 is turned on, i.e., immediately after the vehicle starts to brake, it is possible that an erroneous determination in which it is determined that the vehicle is not rapidly decelerating may be made even though the vehicle is in fact rapidly decelerating.

Therefore, if the time elapsed after the footbrake switch 916 was turned on is within the predetermined period of time after the footbrake switch 916 was turned on (i.e., NO in step S300), the belt squeezing pressure is increased to the value P (ON) that is greater than the normal value P (OFF) that is set as the belt squeezing pressure when the footbrake switch 916 is off regardless of the determination result (step S110).

On the other hand, if the time elapsed after the footbrake switch 916 was turned on is equal to or greater than the predetermined period of time after the footbrake switch 916 was turned on (i.e., YES in step S300), it can be said that a sufficient period of time has passed to correctly determine whether the vehicle is rapidly decelerating.

Therefore, if it is not determined that the vehicle is rapidly decelerating within a predetermined period of time after the footbrake switch 916 was turned on (i.e., NO in step S304), then it can be said that the vehicle is not rapidly decelerating, i.e., the vehicle is gradually decelerating. In this case, the increased belt squeezing pressure is gradually reduced to the normal value P (OFF) that is set as the belt squeezing pressure when the footbrake switch 916 is off (step S108).

As a result, more belt squeezing pressure than is necessary can be inhibited from being applied to the transmission belt 510. Therefore, a decrease in fuel efficiency and a reduction in durability of the transmission belt 510, which result from increased belt squeezing pressure, can be reduced.

If it is determined that the vehicle is rapidly decelerating within the predetermined period of time after the footbrake switch 916 was turned on (i.e., YES in step S304), then it can be said that the vehicle is in fact rapidly decelerating. In this case, the increased belt squeezing pressure is not reduced.

As described above, with the ECU which serves as the control apparatus according to this example embodiment, the belt squeezing pressure applied to the transmission belt is increased when the footbrake switch turns on. This increased belt squeezing pressure is then gradually decreased if it is not determined that the vehicle is rapidly decelerating within a predetermined period of time after the footbrake switch turned on. As a result, it is possible to suppress more belt squeezing pressure than is necessary from being applied to the transmission belt. Therefore, a decrease in fuel efficiency and a reduction in durability of the transmission belt, which result from increased belt squeezing pressure, can be reduced.

Incidentally, this example embodiment may by combined with the second example embodiment described above, and the belt squeezing pressure may be gradually reduced to the value P (M) which is greater than the normal value P (OFF) if it is not determined that the vehicle is rapidly decelerating within a predetermined period of time after the footbrake switch turned on.

Hereinafter, a fourth example embodiment according to the invention will be described. This example embodiment differs from the third example embodiment described above in that it is determined whether the vehicle is rapidly decelerating based on hydraulic pressure supplied to a caliper of the brake system (hereinafter this hydraulic pressure may also be referred to as "brake pressure"). The other structure, and functions thereof, of the fourth example embodiment are the same as those of the third example embodiment so a detailed description thereof will not be repeated here.

Figure 13:
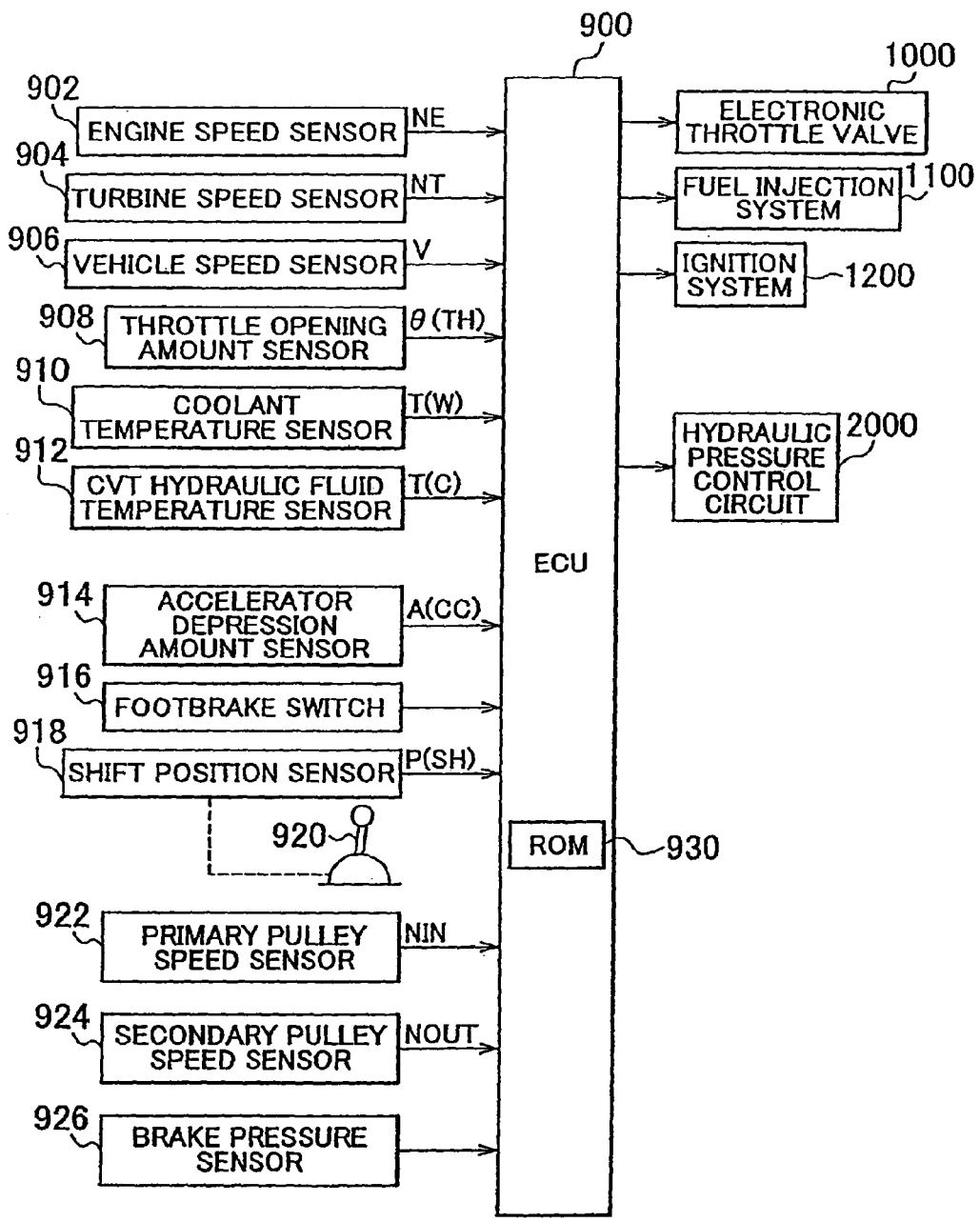
FIG. 13 is a control block diagram of an ECU which serves as a control apparatus according to a fourth example embodiment of the invention.

As shown in FIG. 13, a brake pressure sensor 926 is also connected to the ECU 900 that serves as the control apparatus according to this example embodiment. This brake pressure sensor 926 detects the brake pressure and outputs a signal indicative thereof to the ECU 900. The brake pressure is a value that corresponds to the operation amount of the brake pedal 1302.

Figure 14:
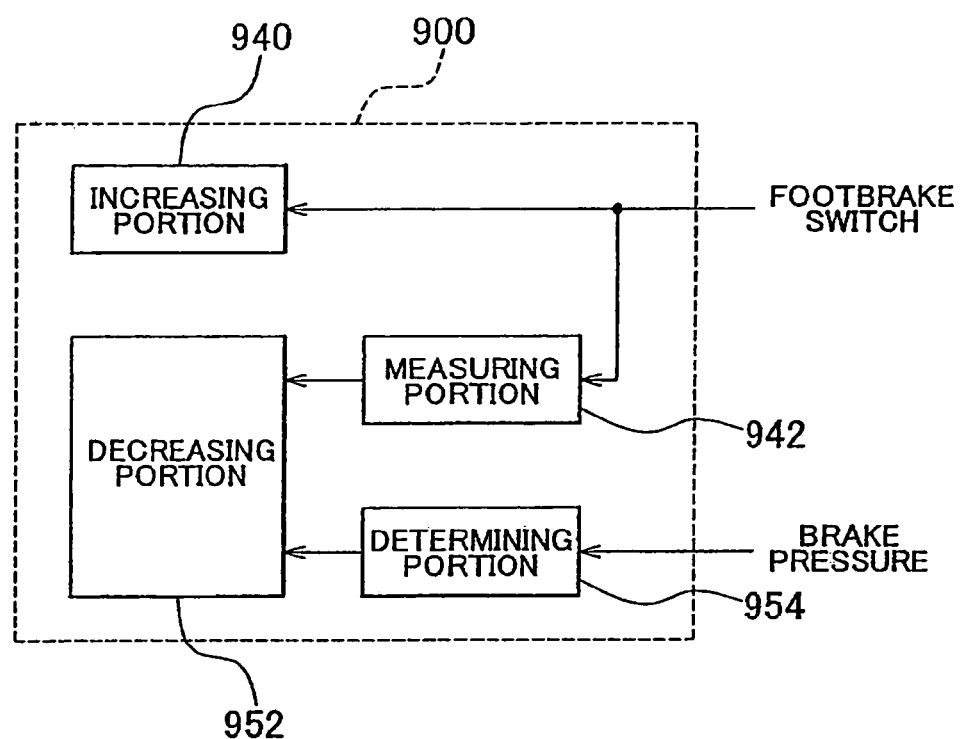
FIG. 14 is a functional block diagram of the ECU which serves as the control apparatus according to the fourth example embodiment of the invention.

The functions of the ECU 900 which serves as the control apparatus according to this example embodiment will further be described with reference to FIG. 14. The functions described below may be realized by hardware or software.

Also, the structure in the fourth example embodiment that is the same as the structure in the first and third example embodiments will be denoted by the same reference numerals so a detailed description of that structure will not be repeated here.

A determining portion 954 in this example embodiment determines that the vehicle is rapidly decelerating when the brake pressure is equal to or greater than a predetermined pressure.

Figure 15:
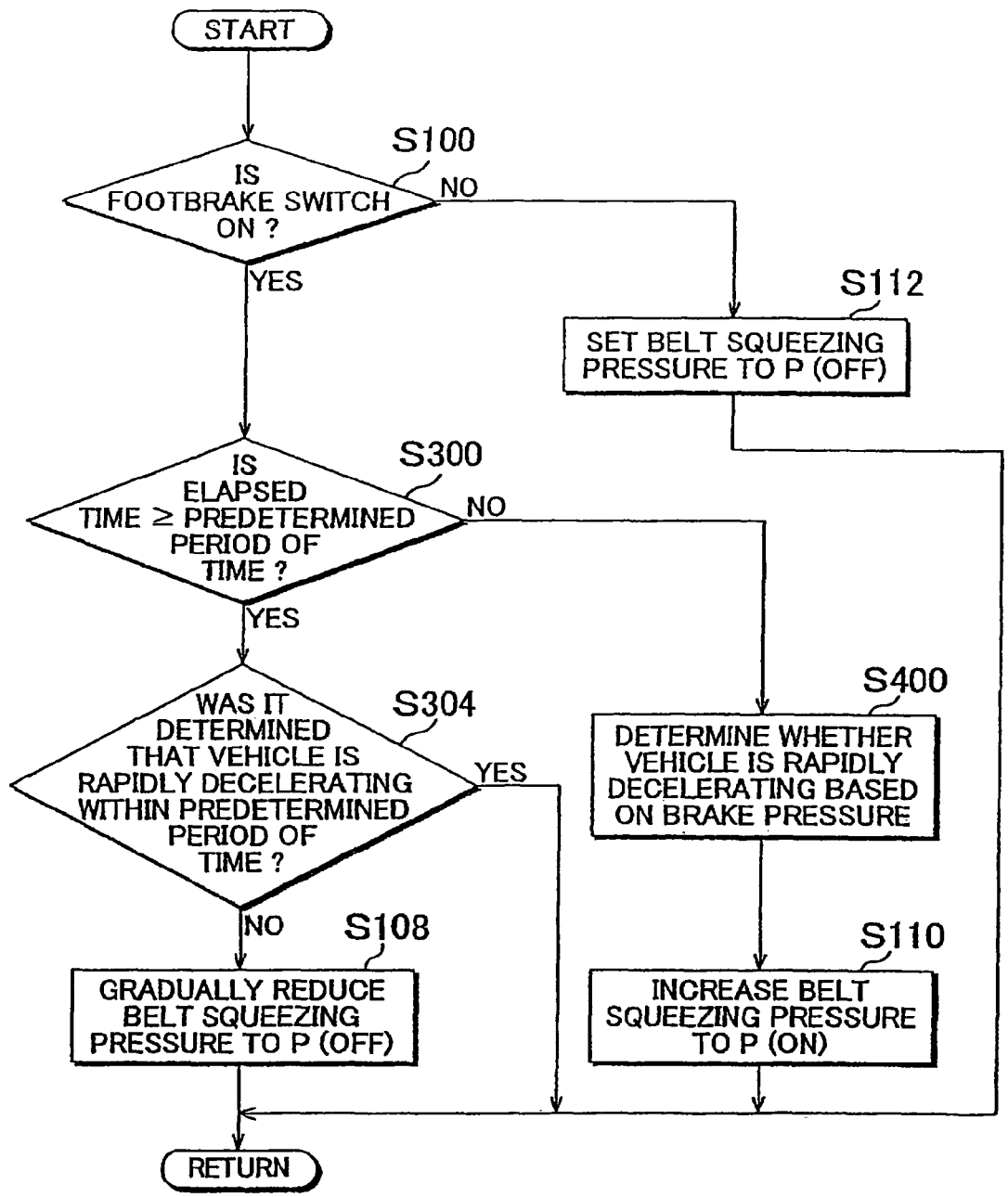
FIG. 15 is a flowchart illustrating the control structure of a program that is executed by the ECU which serves as the control apparatus according to the fourth example embodiment of the invention.

The control structure of a program executed by the ECU 900 which serves as the control apparatus according to this example embodiment will now be described with reference to FIG. 15. The program described below is repeatedly executed in predetermined cycles. Also, the steps in this program that are the same as steps in the program in the first and third example embodiments described above win be denoted by the same step numbers so detailed descriptions of those steps will not be repeated.

In step S400, the ECU 900 determines whether the vehicle is rapidly decelerating based on whether the brake pressure is equal to or greater than a predetermined value.

In this case as well, the same effects as those obtained in the third example embodiment described above can also be obtained. Incidentally, this example embodiment may by combined with the second example embodiment described above and the belt squeezing pressure may be gradually reduced to the value P (M) which is greater than the normal value P (OFF) if it is not determined that the vehicle is rapidly decelerating within a predetermined period of time after the footbrake switch turned on.

Also, the belt squeezing pressure may be gradually reduced if the brake pressure does not become equal to or greater than a predetermined value within a predetermined period of time after the footbrake switch turned on, without determining whether the vehicle is rapidly decelerating based on whether the brake pressure is equal to or greater than a predetermined value.

Furthermore, the increase slope of the brake pressure, the amount the brake pedal 1302 is depressed, the speed with which the brake pedal 1302 is depressed, the force with which the brake pedal 1302 is depressed, or the rate of change in the force with which the brake pedal 1302 is depressed or the like may be used instead of the brake pressure.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

The invention claimed is:

1. A control apparatus of a continuously variable transmission having a pair of pulleys with variable groove widths, and a transmission belt which is wound around the pair of pulleys and transmits power by frictional force, comprising:
   a first control portion that is programmed to increase squeezing pressure applied to the transmission belt when a footbrake switch that detects a brake operation of a vehicle is turned on;
   a measuring device that is programmed to measure the time elapsed after the footbrake switch was turned on; and
   a second control portion that is programmed to reduce the increased squeezing pressure when the measured elapsed time becomes equal to or greater than a predetermined period of time.

2. The control apparatus of a continuously variable transmission according to claim 1, wherein the predetermined period of time is set shorter when a vehicle speed is low than when the vehicle speed is high.

3. The control apparatus of a continuously variable transmission according to claim 1, wherein the second control portion is programmed to reduce the increased squeezing pressure gradually.

4. The control apparatus of a continuously variable transmission according to claim 1, wherein the second control portion is programmed to reduce the increased squeezing pressure to a squeezing pressure that is applied to the transmission belt when the footbrake switch is off.

5. The control apparatus of a continuously variable transmission according to claim 1, wherein the second control portion is programmed to reduce the squeezing pressure to a squeezing pressure that is higher than the squeezing pressure applied to the transmission belt when the footbrake switch is off and lower than the increased squeezing pressure.

6. A control method of a continuously variable transmission having a pair of pulleys with variable groove widths, and a transmission belt which is wound around the pair of pulleys and transmits power by frictional force, comprising:
    increasing squeezing pressure applied to the transmission belt when a footbrake switch that detects a brake operation of a vehicle is turned on;
    measuring the time elapsed after the footbrake switch was turned on; and
    reducing the increased squeezing pressure when the measured elapsed time becomes equal to or greater than a predetermined period of time.

7. The control method of a continuously variable transmission according to claim 6, wherein the predetermined period of time is set shorter when a vehicle speed is low than when the vehicle speed is high.

8. The control method of a continuously variable transmission according to claim 6, wherein reducing the increased squeezing pressure includes reducing the increased squeezing pressure gradually.

9. The control method of a continuously variable transmission according to claim 6, wherein reducing the increased squeezing pressure includes reducing the increased squeezing pressure to a squeezing pressure that is applied to the transmission belt when the footbrake switch is off.

10. The control method of a continuously variable transmission according to claim 6, wherein reducing the squeezing pressure includes reducing the squeezing pressure to a squeezing pressure that is higher than the squeezing pressure applied to the transmission belt when the footbrake switch is off and lower than the increased squeezing pressure.

11. A program by which a computer realizes the control method of a continuously variable transmission according to claim 6.

12. A recording medium that can be read by a computer and on which a program by which a computer realizes the control method of a continuously variable transmission according to claim 6 is recorded.

* * * * *